United States Patent [19]

Suggitt

[11] Patent Number: 4,532,227

[45] Date of Patent: Jul. 30, 1985

[54] LOW ASH PELLETED CARBON AND PROCESS OF PREPARATION

[75] Inventor: Robert M. Suggitt, Wappingers Falls, N.Y.

[73] Assignee: Texaco Development Corporation, White Plains, N.Y.

[21] Appl. No.: 218,610

[22] Filed: Dec. 22, 1980

Related U.S. Application Data

[63] Continuation-in-part of Ser. No. 754,394, Dec. 27, 1976, abandoned.

[51] Int. Cl.³ .................... B01J 21/18; B01J 23/40; C01B 31/02; C01B 31/08
[52] U.S. Cl. .................... 502/180; 423/445; 423/460; 423/461; 502/181; 502/185; 502/416; 585/269
[58] Field of Search ............... 252/444, 447; 423/460, 423/461; 502/416, 180, 181, 185

[56] References Cited

U.S. PATENT DOCUMENTS

| 1,502,896 | 7/1924 | Barneby | 252/421 |
| 1,803,943 | 5/1931 | Miller | 252/444 |
| 3,501,272 | 3/1970 | Benak | 423/461 |
| 3,736,265 | 5/1973 | Suggitt | 252/447 |
| 3,737,460 | 6/1973 | Suggitt | 252/472 |
| 4,066,699 | 1/1978 | Suggitt et al. | 252/444 |
| 4,225,463 | 9/1980 | Unger et al. | 252/444 |

*Primary Examiner*—P. E. Konopka
*Attorney, Agent, or Firm*—Robert A. Kulason; Carl G. Seutter

[57] ABSTRACT

Low ash pelleted carbon is prepared by contacting pelleted carbon first with hydrochloric acid followed by leaching with hydrofluoric acid.

14 Claims, No Drawings

LOW ASH PELLETED CARBON AND PROCESS OF PREPARATION

RELATED APPLICATIONS

This application is a continuation-in-part of application Ser. No. 754,394, filed Dec. 27, 1976, abandoned Dec. 20, 1981.

FIELD OF THE INVENTION

This invention relates to a novel catalyst containing platinum or rhodium on a pelletted low ash carbon. More particularly it relates to a method of hydrogenation using this pelletted catalyst.

BACKGROUND OF THE INVENTION

As is well known to those skilled in the art, a wide variety of unsaturated charge compositions may be hydrogenated to the corresponding saturated product. Typical of these charge compositions is benzene which may be converted to cyclohexane. This process must be characterized by a high degree of activity and selectivity i.e. the benzene must be converted to cyclohexane in yields of 100%; and the product must be readily recovered in purity approaching 100% purity. This is because the cyclohexane product is to be marketed without further purification and/or distillation. Commonly it is desired that the product be of purity of 99.85% or greater cyclohexane; and the product cyclohexane should contain less than about 0.15% (1500 ppm) and preferably not more than about 0.05–0.1% (500–1000 ppm) of benzene.

It is also a feature of this process that it be flexible i.e. that it be able to selectively produce product cyclohexane over a wide range of temperature with little effect on the purity of the product.

It has been found for example that platinum-on-alumina catalysts are not sufficiently selective for use at temperatures above 500° F. without some form of moderation. Typically it is found that it is necessary to have present either a volatile basic nitrogen compound or an oxide of an alkali metal such as lithium, to reduce the acidic effects of the alumina support and to thereby achieve satisfactory results at temperatures up to 650° F. Successful operation at temperature above 650° F. may require the use of non-acidic carbon.

It is also found that it is necessary to use a dry feed when the catalyst is alumina-based—or the low temperature reaction initiation activity is undesirably low. At temperature below about 300° F., the presence of water can suppress the catalytic activity to undesirably low levels.

Although platinum-carbon has been found to be somewhat less sensitive to moisture contamination than platinum-on-alumina, the ability of such compositions to function effectively (at low platinum concentrations) as hydrogenation catalyst has not heretofore been acceptable—the performance is generally found to be inactive-to-poor; and those that are poor are found to be unreproducible.

It is an object of this invention to provide a novel catalyst system and a method of preparing the same. It is another object of this invention to provide a method for hydrogenation. Other objects will be apparent to those skilled in the art.

BRIEF SUMMARY OF THE INVENTION

In accordance with certain of its aspects, the method of this invention for preparing a low ash pelletted carbon characterized by the mechanical strength may comprise leaching a high ash pelletted carbon in contact with hydrochloric acid thereby forming a reduced ash pelletted carbon;

leaching said reduced ash pelletted carbon in contact with hydrofluoric acid thereby forming a low ash pelletted carbon; and recovering said low ash pelletted carbon.

In accordance with certain of its other aspects, the catalyst composition of this invention may comprise a pelletted catalyst support having an ash content of less than about 0.1% of non-volatile ash; and supported thereon a metal selected from the group consisting of platinum and rhodium.

DETAILED DESCRIPTION OF THE INVENTION

The pelletted charge activated carbon which may be treated by the process of the invention may be formed from animal, vegetable, or mineral (including chemical) origin. Activated carbons may be prepared from a wide variety of plentiful materials. Among the more widely used are wood, sawdust, peat, pulp-waste vegetable waste, bone, and blood. All of these precursors contain non-carbon materials that form an ash on combustion. The amount of ash can vary extensively—ranging from 2% for coconut-derived carbon or more for wood and carbon to over 20% for bone char. Typically the ash content of a lignite-derived carbon may be 15%.

It is customary when it is desired to prepare carbon pellets, to incorporate mineral elements into the composition to facilitate the subsequent activation and the development of mechanical strength of the shaped aggregates. Typically zinc chloride has been added to carbonaceous materials such as sawdust to promote their response to activation treatments. Phosphoric acid, sodium phosphate, and dolomite (a calcium magnesium carbonate) are also used.

The preparation of activated carbon pellets includes the formation of such a mixture into shaped aggregates followed by carbonization of the shaped aggregate in the absence of air at temperatures below 1200° F. After carbonization, the pelletted carbon is then activated by a controlled oxidation using e.g. steam or carbon dioxide at 1400°–1700° F. or air at 600° F.–1100° F. The oxidizing gases remove any residual hydrocarbons and form a carbon having a high surface area.

However the mineral matter which is present with the organic precursor (including its inorganic components) and in the chemicals used to promote activation, generally remains with the carbon and is commonly referred to as ash. This mineral matter can be deleterious to catalyst performance. Various shaped activated carbon pellets prepared from vegetable, coal, and petroleum coke are available that contain up to 10 percent mineral material.

Analyses of the ash component reveal a wide variety of elements depending on the source of the carbon and on the agents used to promote activation and pellet strength. Elements commonly found in activated pelletted carbons (aside from carbon) include silicon, aluminum, iron, calcium, sodium, potassium, magnesium, titanium, phosphorus, and sulfur.

The presence of these inorganic materials in the activated carbon can be deleterious to a catalyst prepared from the carbon in a number of ways.

Some of these materials, e.g. sulfur or phosphorus, can act as a poison for sensitive catalytic agents such as rhodium or platinum when the catalyst is used to hydrogenate aromatics to the corresponding naphthenes. Other materials, when present in moderate amounts, can promote unwanted side reactions that create impurities in the naphthene product. For example alumina (at higher operating temperatures e.g. 600+° F. can promote isomerization and hydrocracking. In the hydrogenation of benzene, non-moderated alumina can promote formation of methylcyclopentane and other undesired hexanes and thus contaminate the desired cyclohexane product.

Furthermore polar impurities in the activated catalyst (e.g. calcium carbonate, silica, etc.) tend to sorb out platinum or rhodium complex from the impregnating solution and thus nullify to an extent the advantage of high surface area that the activated carbon possesses. That is, rather than be distributed over the large area of carbon surface, the platinum or rhodium is agglomerated on the low area inorganic material.

The presence of inorganic material also alters the sorption characteristics of the carbon. Thus water sorption can be increased and pores become clogged with attendant loss in catalytic activity.

Various carbon purification processes have been advanced such as vapor phase treatments with chlorine, water washing and acid washing. U.S. Pat. No. 3,501,272 for example teaches that immersing the carbon in a mixture of concentrated hydrofluoric acid and nitric acid followed by treatment in boiling aqueous hydrochloric acid will purify carbon.

The high ash carbons in the form of pellets which maybe treated by the process of this invention may be characterized by their total ash content of up to 20%, typically 3%–10%, say 7–8%, by their $SiO_2$ content of 2%–10%, typically 5.4%–7.7%, say 6.5%, and by their crush strength (after drying overnight at 300° F.) of 10–25, typically 15–25, say 22 pounds (corresponding to 0.8–4, typically 1–4, say 0.9 pounds per millimeter length) when measured on a typical cylindrical pellet having a diameter of 1.5 mm, length of ca 7 mm, and a density of 0.43–0.47 g/cc.

In practice of the process of this invention, the high ash pelletted carbon charge (typically having say 7.7% ash) is first leached with hydrochloric acid in a first leaching operation. Preferably the acid may be 3%–35%, typically 10%–25%, say 20% aqueous hydrochloric acid. Leaching may be effected by use of acid in total amount, in one or more stages, of 0.1–10, preferably 0.5–3, say 1 times the weight of carbon charge. Leaching with hydrochloric acid may typically be effected for 1–144 hours, preferably 8–96 hours, say 72 hours at 100° F.–250° F., typically 130° F.–140° F., say 135° F. at 0–500 psig, typically 0–100 psig, say 0 psig.

Preferably the carbon is water-washed with an excess of water after each leaching with hydrochloric acid.

Optionally the carbon pellets may be acid washed in at least one additional stage using hydrochloric acid under preferably the same conditions as those used in the first washing. At the conclusion of the wash with hydrochloric acid, the ash content may be typically 1%–15%. 1%–10%, say 6.3%; and the ash will contain mostly silica with only minor amounts of iron, phosphate, magnesium, and calcium. The silica content may be typically 1%–9%, preferably 1%–6%, say about 6%. The typical strength (pounds per mm length) may be 0.8–4, commonly 1–4, say 0.9. The wash with hydrochloric acid will have removed most of the non-silica ash constituents. (The solution used in the leaching operations may consist essentially of aqueous hydrochloric acid and be essentially free of other components including other acids such as hydrofluoric acid, nitric acid, sulfuric acid, etc.) The crush strength of the leached carbon is substantially the same as that of the charge carbon pellets.

The crush strength increases as the diameter of a pellet increases. Typically ⅛" (3 mm) diameter cylindrical pellets may have a crush strength of ca 3 #/mm length; and for a 1/32" (0.8 mm) diameter cylindrical pellet, the crush strength may be ca 0.9 #/mm length; for a 1/16" (1.5 mm) pellet, ca 1.5 #/mm.

The reduced ash carbon as so prepared may in accordance with the preferred aspect of this invention be leached with hydrofluoric acid. Preferably the acid may be 2%–49%, typically 5%–30%, say 10% aqueous hydrofluoric acid. Leaching may be effected by use of acid in total amount, in one or more stages, of 0.02–10, preferably 0.1–1, say 0.2 times the weight of carbon charge. Leaching with hydrofluoric acid may typically be effected for 1–144 hours, preferably 8–72 hours, say 48 hours at 100° F.–210° F., typically 130° F.–140° F., say 135° F. at 0–500 psig, typically 0–100 psig, say 0 psig. The preferred leaching solution in this second leaching operation may consist essentially of aqueous hydrofluoric acid and be essentially free of other components including other acids such as hydrochloric acid, nitric acid, sulfuric acid, etc.

In one preferred embodiment, the leaching with hydrochloric acid and the leaching with hydrofluoric acid may each be separately carried out in a single separate step. In another preferred embodiment, each of the leachings may be carried out in several steps. Thus the charge high ash carbon may be leached 2–5 times with hydrochloric acid to yield the reduced ash carbon and then subsequently leached 2–5 times with hydrofluoric acid. Preferably one or more water washes may follow each of the acid washes.

The HF-washed pelletted carbon may contain less than 0.1% total ash, commonly 0.05%–1%. The silica content is of the same order of magnitude i.e. less than 1% commonly 0.05%–0.1%. The ash may typically consist essentially of silica. The halide ion content is 0.1%–5%, commonly 0.1%–2%, say 0.4%. The strength (pounds per mm of length) may be 0.8–4, commonly 1–4, say 0.9.

At the conclusion of the leaching with hydrofluoric acid, it is preferred that the low ash carbon be treated to lower the halide from its value of 0.1%–5%, preferably 0.1%–2%, say 0.40% to a final value of 0.01%–0.5%, preferably 0.01%–0.2%, say 0.03%.

This may preferably be effected by leaching with an organic acid and preferably a water-soluble organic acid such as acetic acid, propionic acid, butyric acid (the latter being less preferred because of lower solubility and higher boiling point), etc. The preferred acid is acetic acid in 5%–50%, preferably 10%–30%, say 20% aqueous solution.

Treatment with the preferred acetic acid may be effected by contacting the low ash carbon with 0.5–50 times, preferably 1–10, say about five times its weight of acetic acid for 0.5–48, preferably 1–10, say 5 hours at 60° F.–200° F., preferably 130° F.–140° F., say 135° F.

and 0–500 psig, preferably 0–100 psig, say 0 psig. Leaching with acetic acid may be effected in one or more steps to yield a low ash carbon containing reduced halide values.

At the conclusion of the wash with the preferred 20% acetic acid, the ash content of the low ash carbon may be typically less than 0.1 wt. %. Generally the acetic acid treatment will have little or no measurable effect on the total ash or silica content. The halide content is preferably less than 0.5%; and it may be 0.01%–0.5%, preferably 0.01%–0.2%, say 0.03%. The strength of the pellet is typically unaffected by acetic acid treating.

The carbon pellets may be dried at 100° F.–1000° F., preferably 180° F.–300° F., say 230° F. for 2–24 hours, preferably 6–10 hours, say 8 hours and then cooled to ambient temperature of 50° F.–100° F., preferably 65° F.–90° F., say 70° F.

In practice of the preferred aspect of this invention, a catalyst composition particularly characterized by its ability to efficiently catalyze hydrogenation reactions may be prepared by depositing a metal selected from the group consisting of platinum and rhodium onto a pelletted carbon catalyst support having an ash content of less than about 0.1% of non-volatile ash. The preferred low ash carbon which may be employed may be that prepared by the process disclosed supra.

In accordance with this aspect of the invention, the catalyst may be prepared by impregnating the carbon, preferably in the form of low ash pellets, with (typically by immersion in) a solution of a metal preferably selected from the group consisting of platinum and rhodium.

Platinum may be deposited on the pelletted catalyst support from a solution containing 0.2–50, preferably 6–20, say 10 parts of platinum per 1000 parts of solution prepared by neutralizing an aqueous solution of chloroplatinic acid with ammonium hydroxide and continuing addition of the latter until a clear solution of the amine complex is obtained. A small amount of methyl alchohol may be added to the solution.

Rhodium may be deposited on the pelletted catalyst support from a solution containing 0.2–50, preferably 0–20, say 10 parts of rhodium per 1000 parts of solution prepared by reacting a solution of rhodium chloride in methanol with an excess of ammonium hydroxide to form a clear solution of the rhodium amine complex in methanol.

The pelletted catalyst support may remain in contact with the rhodium or platinum solution for 1–24 hours, preferably 1–8 hours, say 1.5 hours at 50° F.–122° F., preferably 68° F.–86° F., say 77° F. The support particles which adsorb solution during this period may be separated and dried at 200° F.–400° F., preferably 220° F.–360° F., say 300° F. for 4–24 hours, preferably 6–10 hours, say 8 hours in a non-oxidizing atmosphere such as nitrogen. The pelletted catalyst particles may be calcined at 700° F.–1000° F., preferably 842° F.–932° F., say 896° F. for 1–4 hours, preferably 2–3 hours, say 1 hour in an inert atmosphere such as nitrogen or hydrogen.

The loaded pelletted catalyst composition so-prepared may thus comprise a pelletted catalyst support having an ash content of less than about 0.1% of non-volatile ash; and supported thereon a metal selected from the group consisting of platinum and rhodium. It may contain both platinum and rhodium.

The pelletted catalyst compositions of this invention may contain platinum in amount of 0.2%–5%, preferably 0.2%–2%, say about 1.1% and/or rhodium in amount of 0.2%–5%, preferably 0.2%–2%, say about 1% by weight of the total.

Illustrative of the pelletted product catalysts so prepared may be:

(a) a pelletted wood-derived carbon (originally containing 7.7% total ash and 5% silica) treated by the process of this invention to yield a carbon containing less than 0.1% total ash and less than 0.05% silica on which has been deposited 1.09% platinum (crush strength of ca 1.7 #/mm length and halogen content of about 0.1%);

(b) a pelletted bone-derived carbon (originally containing 15% total ash and 5% silica) treated by the process of this invention to yield a carbon containing 0.07% total ash and ca 0.04% silica on which has been deposited 0.85% platinum (crush strength of ca 1.8 #/mm length and halogen content of about 0.01%);

(c) a pelletted petroleum (from petroleum coke) derived carbon (originally containing 2.5% total ash and 2% silica) treated by the process of this invention to yield a carbon containing 0.1% total ash and 0.01% silica on which has been deposited about 1% rhodium (crush strength of ca 1.7 #/mm length and halogen content of about 0.03%).

It is a particular feature of the process of this invention that the novel pelletted catalyst may be employed in a wide variety of hydrogenation reactions including the hydrogenation of aromatics to naphthenes, of unsaturated parrafins to saturated parrafins, of nitro compounds to amines, of ketones to secondary alcohols, of aldehydes to primary alcohols, etc. It is particularly useful in connection with the hydrogenation of benzenes to cyclohexanes.

During the course of carrying out the hydrogenation of aromatics, such as benzene, to the corresponding naphthenes, typically cyclohexane, the catalyst may normally be pretreated by heating in the presence of hydrogen for 2–24 hours, preferably 4–20 hours, say 16 hours at 572° F.–1022° F., preferably 750° F.–932° F., say 860° F.

The charge to hydrogenation may comprise an aromatic including benzenes such as benzene se, toluene, ethylbenzene, cyclohexyl benzene, etc. Preferably hydrogenation may be effected in vapor phase by passing the charge hydrocarbon and hydrogen into contact with the catalyst at pressure of 0–1000 psig, preferably 500–600 psig, say 500 psig.

The temperature of the charge to hydrogenation may be 180° F.–650° F., preferably 200° F.–400° F., say 300° F., and this may correspond to a maximum temperature within the catalyst bed of 500° F.–700° F., preferably 500° F.–610° F., say about 570° F. It is unexpected that hydrogenation may be carried out substantially stoichiometrically in reasonable time at inlet temperatures as low as e.g. about 300° F.

Hydrogenation may typically be effected at an LHSV of 0.1–4 preferably 1–2, say 1.5 with mole ratio of hydrogen to e.g. benzene of 4–12, preferably 5–9 say 7. Hydrogenation may be carried out in the presence of inert diluent, preferably product cyclohexane; and the volumetric ratio of cyclohexane to benzene in the charge may be 2–6:1, say 3:1.

During hydrogenation, the benzene charge may be converted to product cyclohexane in substantially stoichiometric yield. The effluent stream from hydrogenation may be substantially pure cyclohexane substantially free of unconverted benzene. In practice of the hydrogenation process of this invention, the product may commonly be obtained in purity above 99.85% and typically in purity of about 99.9%–99.95%. The unhydrogenated benzene present in the product cyclohexane may desirably be less than about 500–1000 ppm (0.05%–0.1%) and commonly it may be possible to obtain product cyclohexane containing less than 60 ppm benzene. The product so obtained may be readily marketed without further treatment or rectification.

It is particularly unexpected to be able to achieve hydrogenation of benzene to high purity cyclohexane in high yield by the use of low (less than about 0.5%) concentrations of platinum or rhodium on the low ash carbon of this invention—it is noted for example that other metals such as palladium on low ash carbon (e.g. 1% Pd on 0.14% ash) are completely inactive at inlet temperature up to 500° F. Catalyst prepared on a low ash carbon support may retain its activity for unexpectedly long periods—typically 6 months or more.

It will be apparent to those skilled in the art that the particular level of total ash (determined by ignition to 1700° F. in air followed by holding at 1700° F. overnight) will depend upon many factors including the particular charge carbon, its method of preparation and pellettizing, and the degree of treating as herein noted. Also apparent is the fact that the level of ash, silica, and halide in the final pelleted carbon may be controlled to give levels which are satisfactory for the particular use to which the product is to be put. Typically for example, a charge pelletted carbon may be that available as the American Norit R-4220 brand of carbon containing e.g. 3%–10%, say 7.7% total ash of which 50%–100% is typically $SiO_2$ (and the remainder contains oxides of Mg, Na, Ca, Al, and Fe). This latter corresponds to a $SiO_2$ content of ca 2%–10%, typically 5.4%–7.7%, say 6.5%.

After the HCl treatment of the process of this invention, the total ash may be reduced to 1%–15%, say 1%–10%, say 6.3% and the silica content may be 1%–9%, typically 1%–6%, say 6%.

After the HF treatment of the process of this invention, the total ash may be reduced to less than about 0.1% and typically 0.05–0.1%. Frequently the total ash and total silica at this point are so low that reliable chemical analyses cannot be obtained.

When it is desired to further treat the pelletted carbon which contains halide ion in amount of 0.1–5% typically 0.1%–2%, say 0.40% with e.g. acetic acid as noted, the product may then also be characterized by its halide content of 0.01%–0.5%, typically 0.01%–0.2%, say 0.03%.

Comparable reductions (together with attendant advantages) may be attained with other charge carbons containing substantially lower or higher concentrations of undesirable components.

It will be noted that the pellet strength commonly remains essentially constant during these procedures; and it may be 0.8–4, preferably 1–4, say 0.9 pounds per mm of length of the cylindrical pellets of diameter of ca 0.8 mm and a length of 5 mm. For a pellet of diameter 1.5 mm and a length of 1.5 mm, the strength may be 1–4, typically 1.7 pounds per mm, and for a pellet of diameter of ca 3.2 mm and a length of ca 5–9 mm, say 7 mm, the strength may be 2–4, say 3 pounds per mm length.

It will be apparent to those skilled in the art that the process of this invention permits attainment of products which are not undesirably characterized by those properties which would be observed if the carbon pellets were treated by processes outside the scope of this invention including those using sulfuric acid (which builds up ash), nitric acid (which lowers pellet strength), or with other combinations of acids including hydrochloric acid, hydrofluoric acid, acetic acid etc., singly or in various combinations or orders.

DESCRIPTION OF PREFERRED EMBODIMENTS

Practice of the process of this invention may be apparaent to those skilled in the art from the following examples wherein, as elsewhere in this specification, all parts are parts by weight.

EXAMPLES I-IV

In this series of examples, charge commercially available activated carbon pellets sold by American Norit Co. under the trademark Norit R3230 are employed. These pellets are of irregular shape of average diameter of about 3 mm, of average apparent density of about 0.47 g/cc, and crush strength of ca 3.3 #/mm of length. After calcination, 4.3% non-volatile ash remains which may typically analyze as follows:

| Component | % |
|---|---|
| $Na_2O$ | 5 |
| $MgO$ | 20 |
| $CaO$ | 10 |
| $Al_2O_3$ | 10 |
| $Fe_2O_3$ | 1 |
| $PO_4^{=}$ | 3.5 |
| $SiO_2$ | 50 |
| $TiO_2$ | 0.5 |

In control Example I, the carbon is impregnated with platinum by contact with an aqueous solution (containing 50 g/l of platinum) of ammonium chloroplatinate followed by drying at 212° F. and by further heating at 700° F. in a stream of hydrogen. The catalyst contained 1.03% platinum.

In control Example II, the carbon (prior to platinum impregnation) is leached in an excess of 6N hydrochloric acid at 130° F.–140° F. for 72 hours. The acid is then drained and the carbon is water-washed until the wash water was chloride-free. The carbon is then immersed in an excess of 20% acetic acid solution at 70° F. for 18 hours. The acetic acid is drained and the carbon, after water washing, is heated to 500° F. for 12 hours. It is then impregnated with platinum, as in Example I, to yield a product having a platinum content of 1.05%.

In experimental Example III, carried out in accordance with the process of this invention, the charge carbon (prior to impregnation with platinum) is leached in an excess of 6N aqueous hydrochloric acid for 72 hours. At the end of this time, the liquid is drained off; and the carbon is leached in fresh 6N aqueous hydrochloric acid for 72 hours more. The liquid is drained off. At this time the ash content is about 0.1%, the silica content is about 0.1%, the halogen content is about 0.4%, and the pellet strength is about 3.4 #/mm; and the carbon is leached in fresh aqueous 10% hydrofluoric acid for 18 hours. The liquid is then drained. At this time, the ash content is 0.09%, the silica content is about 0.08%, the halogen content is about 0.4%, and the pellet strength is about 3.6 #/mm.

The pellet is then immersed in an excess of 20% aqueous acetic acid. This latter step is repeated twice more. (All these acid leachings are at temperature of 130° F.–140° F.). The carbon, after water washing, is then dried at 300° F. At this time, the ash content is about 0.09%, the silica content is about 0.08%, the halogen content is about 0.03%, and the pellet strength is still about 3.5 #/mm. The carbon is then impregnated with platinum as in Example I to yield a product containing 1.09% platinum.

In control Example IV, the carbon (prior to impregnation with platinum as in Example I) is leached twice, each time for 48 hours, with an excess of aqueous 10% hydrofluoric acid at 130° F.–140° F. After water washing, it is contacted with an excess of 30% aqueous acetic acid solution, at 130° F.–140° F. The acetic acid is drained and the carbon water washed; the carbon is then dried at 300° F. and impregnated as in Example I to yield a product containing 0.61% platinum.

Each of these four catalysts is used as catalyst in the hydrogenation of benzene to cyclohexane at 500 psig, 4 LHSV, 3:1 volume ratio of cyclohexane to benzene in the feed; 7:1 mole ratio of hydrogen to benzene in the feed; and at temperatures noted in the following table. The benzene content of the product stream is measured. In the case of Example IV, it is measured after 12 hours at 300° F., then again after 6 hours at 400° F., and then again after a total of 12 hours at 400° F.

TABLE

| Example | Total Ash % | Inlet Temp. °F. | % Benzene in Product Stream |
|---|---|---|---|
| I* | 4.3 | 328 | 26% |
| II* | 0.97 | 490 | 26% |
| III | 0.09 | 300 | 0 |
| IV* | 2.67 | 300(12 h) | 1.0 |
| IV* | | 400(6 h) | 0.73 |
| IV* | | 400(12 h) | 1.68 |

*Control example

From the above Table, it will be apparent that the benzene content of the product stream in Examples I and II is the same (26%) as the benzene content of the charge; and accordingly, the carbon-platinum composition is not a catalyst for this reaction at the condition of operation.

In Example III, the product stream contains only 14–31 parts per million (ppm) of benzene in the product stream. The cyclohexane purity is 99.9+%. Only about 50 ppm of undesired methylcyclopentane is formed. This is satisfactory.

In Example IV, the product stream contains (depending upon the temperature and the time) 0.73%–1.68% benzene. This is unsatisfactory; the product would have to be further processed to give 99.9% cyclohexane.

Clearly only the experimental catalyst of Example III permits attainment of satisfactory results in terms of hydrogenation activity.

EXAMPLES V–VIII

In this series of examples, charge commerically available activated carbon pellets sold by American Norit Co. under the trademark Norit R3230 are employed. These pellets, which are from a different batch than those used in Examples I–IV, are of irregular shape of average diameter of about 3 mm and of average weight of about 0.7 g. After calcination, 7.65% (on average) non-volatile ash remains which may typically analyze essentially similarly to the analysis set forth in Examples I–IV.

In control Example V, the carbon is impregnated with platinum by contact with an aqueous solution (containing 50 g/l of platinum) of ammonium chloroplatinate followed by drying at 212° F. and by further heating at 700° F. in a stream of nitrogen. The catalyst contained 0.85% platinum.

In control Example VI, the carbon (prior to platinum impregnation) is leached in an excess of 6N hydrochloric acid at 130° F.–140° F. for 72 hours. The acid is then drained and leached with an excess of fresh 6N hydrochloric acid at 130° F.–140° F. for 72 hours. The acid is then drained and the carbon is water-washed until the water was chloride-free. The carbon was then immersed in an excess of 20% acetic acid at 70° F. for 18 hours; it is then immersed for a second and a third time in acetic acid under the same conditions. The acetic acid is drained and the carbon, after water-washing, is heated to 300° F. for 12 hours. It is then impregnated with platinum to yield a product having a platinum content of 1.11%.

In experimental Example VII, carried out in accordance with the process of this invention, the charge carbon (prior to impregnation with carbon) is leached twice with an excess of 6N aqueous hydrochloric acid at 130° F.–140° F. for 72 hours each time. The carbon is water washed and then contacted with an aqueous solution of 10% hydrofluoric acid for 18 hours. The carbon is then water washed and then contacted three times, each time with an excess of 20% aqueous solution of acetic acid at 130° F.–140° F. The catalyst, after water-washing, is dried at 300° F. The carbon is then impregnated with platinum as in Example I to yield a product catalyst containing 0.98% platinum.

In experimental Example VIII, the carbon (prior to impregnation with platinum as in Example I) is leached with an excess of aqueous 6N hydrochloric acid at 130° F.–140° F. for 72 hours and then water-washed until the water is chloride-free. The carbon is then contacted with an excess of aqueous 10% hydrofluoric acid at 130° F.–140° F. for 18 hours. After water washing, the carbon is contacted three times with fresh aliquots of an excess of aqueous 20% acetic acid. The acetic acid is drained; the carbon is water washed; and the carbon dried at 300° F. in nitrogen. It is then impregnated as in Example I to yield a product containing 1.38% platinum.

Each of these four catalysts is used as catalyst in the hydrogenation of benzene to cyclohexane at 500 psig, 4 LHSV, 3:1 volume ratio of cyclohexane to benzene in the feed; 7:1 mole ratio of hydrogen to benzene in the feed; and at inlet temperatures noted in the following table. (In Example VIII, the mole ratio of hydrogen to benzene in the feed was 5:1) The benzene content of the product stream is measured at various times.

TABLE

| Example | Total Ash % | Temp. °F. | Time hrs. | % Benzene in Product Stream |
|---|---|---|---|---|
| V* | 7.65 | 300 | 6 | 1.05 |
| | | | 24 | 1.25 |
| VI* | 5.0 | 300 | 6 | 1.87 |
| | | | 12 | 4.14 |
| | | | 18 | 7.33 |
| VII | 0.05 | 300 | 6 | 0.12 |
| | | | 18 | 0.056 |
| | | | 24 | 0.0455 |

TABLE-continued

| Example | Total Ash % | Temp. °F. | Time hrs. | % Benzene in Product Stream |
|---|---|---|---|---|
| VIII | 0.05 | 350 | — | 0.11 |

*control example

From the above table it will be apparent that the catalyst of control Examples V and VI give product streams containing 1.05%–7.33% benzene. This is unsatisfactorily high. Experimental Examples VII and VIII give product gas streams containing less than 0.12% benzene in the product stream; and in the case of Example VII, the concentration of benzene desirably dropped to 0.04555%.

EXAMPLES IX–XII

In this series of experimetal Examples, the same catalyst was used as in Example III supra.

The charge hydrocarbon stream contained the following components:

| Component | Amount |
|---|---|
| Isopentane | 2 ppm |
| n-pentane | 561 ppm |
| Isohexanes | 84 ppm |
| n-hexane | 179 ppm |
| methylcyclopentane | 479 ppm |
| Toluene | 33 ppm |
| Naphthenes | 66 ppm |
| Benzene | 25.9% |
| Cyclohexane | 74.0% |

Prior to hydrogenation, the charge stream was passed through Linde 5A molecular sieves to remove n-paraffins including n-pentane and n-hexane.

Hydrogenation is effected by passing the charge stream in gas phase into contact with the catalyst at 500 psig, 4 LHSV, and at a hydrogen to benzene mole ratio of approximately 7:1. The inlet temperature to the catalyst bed and the maximum catalyst bed temperature are as set forth in the following table as is the composition of each of the product streams.

TABLE

|  | IX | X | XI | XII |
|---|---|---|---|---|
| Hours on Stream | 4 | 12 | 20 | 20 |
| Inlet Temp. °F. | 300 | 300 | 352 | 352 |
| Max. Temp. °F. | 580 | 606 | 654 | 651 |
| Product |  |  |  |  |
| *Isopentane | 3 | 2 | 6 | — |
| *n-pentane | 1 | 1 | — | — |
| *Isohexanes | 82 | 81 | 78 | 82 |
| *n-hexane | 7 | 17 | 24 | 30 |
| *Methylcyclopentane | 515 | 552 | 555 | 570 |
| *Naphthenes (C₇) | 129 | 110 | 132 | 122 |
| *Benzene | 16 | 14 | 26 | 34 |
| Cyclohexane % | 99.9% | 99.9% | 99.9% | 99.9% |

*ppm

From the above table, it will be apparent that the process of this invention permits attainment of cyclohexane product in purity of 99.9% containing only 14–34 ppm of benzene.

EXAMPLES XIII–XVII

In this series of experimental Examples, the catalyst is prepared as in Example VII supra.

The charge hydrocarbon stream of composition as set forth in the following table is hydrogenated under the same conditions as used in Examples IX–XIII; and the composition of the product stream is as set forth in the following table.

TABLE

|  | Feed | XIII | XIV | XV | XVI | XVII |
|---|---|---|---|---|---|---|
| Hours on Stream |  | 6 | 18 | 24 | 30 | 36 |
| Catalyst Bed Inlet Temp. °F. |  | 324 | 313 | 324 | 316 | 423 |
| Max. Catalyst Bed Temp. °F. |  | 589 | 573 | 584 | 590 | 656 |
| Components |  |  |  |  |  |  |
| *n-hexane | 52 | — | 50 | 127 | 45 | 38 |
| *Methylcyclopentane | 314 | 150 | 227 | 244 | 227 | 290 |
| *Benzene | 20.9% | 1137 | 560 | 455 | 793 | 750 |
| Cyclohexane | 79% | 99.87% | 99.9% | 99.9% | 99.89% | 99.89% |

*All values are parts per million (ppm) except benzene and cyclohexane content of feed and cyclohexane content of product.

From the above table, it will be apparent that by use of the process of this invention, it is possible to hydrogenate benzene to yield cyclohexane product of 99.87% or greater purity and containing 1137 ppm or less benzene impurity.

EXAMPLES XVIII–XIX

In this series of experimental Examples, the catalyst is prepared in the same manner as in Example VIII except that the catalyst contains 1% of rhodium instead of platinum.

The charge hydrocarbon (set forth in the following table) is hydrogenated under the same conditions as used in Examples IX–XII; and the composition of the product stream is as set forth in the following table.

TABLE

|  | Feed | XVIII | XIX |
|---|---|---|---|
| Catalyst Bed Inlet Temp. °F. | — | 418 | 471 |
| Max. Catalyst Bed Temp. | — | 607 | 636 |
| Components |  |  |  |
| *Isopentane | — | 7 | 3 |
| *n-pentane | — | 8 | 5 |
| *Isohexanes | 15 | 63 | 56 |
| *n-hexane | 100 | — | 151 |
| *methylcyclopentane | 407 | 407 | 406 |
| *Benzene | 21.8% | 1236 | 989 |
| Cyclohexane | 78.1% | 99.8% | 99.8% |

*All values are parts per million (ppm) except for benzene and cyclohexane in the charge and cyclohexane in the product.

From the above table, it will be apparent that the process of this invention permits attainment of cyclohexane product of 99.8% purity having 989–1236 ppm of benzene.

In each of the Experimental examples, the desired criteria of ash and silica fall within the scope of this invention and in each of the control examples, these criteria are not met. It is for this reason that the experimental examples are particularly characterized by attainment of a selective catalyst of undiminished pellet strength which does not appear to be deactivated by any water in the charge and which is particularly characterized by production of high purity product over a wide range of temperature. It should be noted that the preferred acetic acid treatment is particularly effective in lowering the halide content with no undesirable effect upon ash, silica, strength, selectivity, etc. Results comparable to those specifically shown are attained when the catalyst has not been treated with acetic acid—but the presence of undesirable corrosion-inducing halides may be noted in that instance.

EXAMPLE XX*

In this control example, an activated pelletted carbon containing 4.3% ash is contacted with 6N aqueous nitric acid for two days at 130° F.-140° F. After thorough washing with water followed by drying in a stream of nitrogen, the carbon is found to contain 1.48% ash and no halides.

The crush strength is found to be reduced from an initial value of 18 down to a final value of 7.6 pounds. A loss of this magnitude renders this control technique unacceptable.

It will be apparent to those skilled in the art that the pelletted carbon products of this invention are particularly characterized by high strength and particulate integrity and by low ash. The novel products retain their particulate integrity over a long life. They have low sensitivity to deterioration in the presence of moisture and when required can be readily rejuvenated or regenerated with hydrogen stripping. Their uniform configuration permits good contact with feed.

Pelletted carbons, such as those of this invention, are characterized by properties which are completely different from other carbon products such as carbon powders or graphites, or carbon particles or slabs.

Pellets must meet strength and uniformity and low ash criteria which are not necessary in the case of these other materials. For example the crush strength of a carbon powder is not a relevant consideration and is not normally determined.

The novel pellets unexpectedly maintain their particulate strength and integrity when treated by the process of this invention. This is not true of many prior art techniques typified by that of Example XX* supra wherein treatment with nitric acid decreases the pellet strength to an undesirable degree.

Although this invention has been illustrated by reference to specific embodiments, it will be apparent to those skilled in the art that various changes and modifications may be made which clearly fall within the scope of this invention.

I claim:

1. The method of preparing a low ash pelletted carbon which comprises
   leaching a high ash pelletted carbon in contact with hydrochloric acid thereby forming a reduced ash pelletted carbon;
   leaching said reduced ash pelletted carbon in contact with hydrofluoric acid thereby forming a low ash pelletted carbon; and
   recovering said low ash pelletted carbon.

2. The method of preparing a low ash pelletted carbon as claimed in claim 1 wherein said high ash pelletted carbon contains 2-20% non-volatile ash.

3. The method of preparing a low ash pelletted carbon as claimed in claim 1 wherein said hydrochloric acid is aqueous hydrochloric acid.

4. The method of preparing a low ash pelletted carbon as claimed in claim 1 wherein said leaching with hydrochloric acid is carried out for 1-144 hours.

5. The method of preparing a low ash pelletted carbon as claimed in claim 1 wherein said leaching with hydrochloric acid is carried out at 100° F.-250° F.

6. The method of preparing a low ash pelletted carbon as claimed in claim 1 wherein said leaching with hydrochloric acid is carried out at 130° F.-140° F.

7. The method of preparing a low ash pelletted carbon as claimed in claim 1 wherein said hydrofluoric acid is aqueous hydrofluoric acid.

8. The method of preparing a low ash pelletted carbon as claimed in claim 1 wherein said leaching with hydrofluoric acid is carried out for 1-144 hours.

9. The method of preparing a low ash pelletted carbon as claimed in claim 1 wherein said leaching with hydrofluoric acid is carried out at 100° F.-250° F.

10. The method of preparing a low ash pelletted carbon as claimed in claim 1 wherein said leaching with hydrofluoric acid is carried out at 130° F.-140° F.

11. The method of preparing a low ash pelletted carbon as claimed in claim 1 wherein said low ash pelletted carbon contains less than about 0.1% non-volatile ash.

12. The method of preparing a low ash pelletted carbon from a high ash pelletted carbon containing 3%-10% non-volatile ash including silica and non-silicious components selected from the group consisting of sodium, magnesium, calcium, aluminum, iron, and phosphate which comprises
    leaching said high ash pelletted carbon in contact with aqueous hydrochloric acid at 100° F.-250° F. thereby forming a reduced ash carbon;
    leaching said reduced ash pelletted carbon in contact with aqueous hydrofluoric acid at 100° F.-250° F. thereby forming a low ash pelletted carbon containing less than 0.1% of non-volatile ash; and
    recovering said low ash pelletted carbon.

13. A low ash pelletted carbon characterized by an ash content of less than about 0.1% of non-volatile ash and by a silica content of less than 0.1% prepared by the process of claim 12.

14. A low ash pelletted carbon characterized by an ash content of less than about 0.1% of non-volatile ash prepared by the method which comprises
    leaching a high ash pelletted carbon in contact with hydrochloric acid thereby forming a reduced ash pelletted carbon;
    leaching said reduced ash pelletted carbon in contact with hydrofluoric acid thereby forming a low ash pelletted carbon; and
    recovering said low ash pelletted carbon.

* * * * *